United States Patent [19]

Borcherding

[11] Patent Number: 4,910,424
[45] Date of Patent: Mar. 20, 1990

[54] BEARING RETAINER FOR DYNAMOELECTRIC MOTOR

[75] Inventor: Gary W. Borcherding, Florissant, Mo.

[73] Assignee: Emerson Electric Co., St. Louis, Mo.

[21] Appl. No.: 255,755

[22] Filed: Oct. 7, 1988

[51] Int. Cl.⁴ .......................... H02K 5/16; F16C 23/04
[52] U.S. Cl. ..................................... 310/90; 384/209; 384/214
[58] Field of Search ................. 310/90; 384/209, 210, 384/214, 215; 267/161, 164

[56] References Cited

U.S. PATENT DOCUMENTS

| | | | |
|---|---|---|---|
| 3,794,869 | 2/1974 | Apostoleris | 310/90 |
| 4,635,352 | 1/1987 | Uhen | 310/90 |
| 4,806,025 | 2/1989 | Kamiyama et al. | 310/90 |

Primary Examiner—Patrick R. Salce
Assistant Examiner—D. L. Rebsch
Attorney, Agent, or Firm—Polster, Polster and Lucchesi

[57] ABSTRACT

A dynamoelectric machine comprises a housing (H), a rotatable shaft (S) installed in the housing and a bearing (B) in which the shaft is journaled. The bearing is installed in the housing adjacent each end wall (W) thereof. A bearing retainer (3) fits over the bearing and contacts an inner portion (7) of the end wall to hold the bearing in position. The retainer includes fingers (21) for self-aligning the retainer with the bearing and for maximum control and flow of lubricant along each end and outer surface of the bearing.

14 Claims, 1 Drawing Sheet

BEARING RETAINER FOR DYNAMOELECTRIC MOTOR

BACKGROUND OF THE INVENTION

This invention relates to dynamoelectric machines and more particularly, to an improvement to such machines for retaining a shaft bearing in position adjacent an end wall of the machine housing. While the invention is described in particular detail with respect to such application, those skilled in the art will recognize the wider applicability of the invention disclosed hereinafter.

In dynamoelectric machines such as electric motors, two important concerns in attaining product useful life criteria are maintaining the bearings which journal the rotor shaft in their proper position, and insuring proper lubrication of the bearing. To insure the bearings remain in their proper positions, a bearing retainer system is required which minimizes parts and which is readily assembled with the rest of the motor components. Since a bearing retainer can act as a barrier to lubricant flow about and around the bearing (because the retainer fits within a lubricant reservoir, and between the bearing and portions of the motor shaft), it is further important for a bearing retainer to allow passage of lubricant to these parts of the motor. Lubricant migrating down the motor shaft also must be allowed to return to the lubricant reservoir, or bearing life is adversely effected.

Self-aligning bearings, and retainers for them are well known in the art. The bearing system disclosed hereinafter distinguishes over the art because, among other reasons, (i) the retainer is constructed to maintain its position using a self-locking feature without any special additional locking structure; (ii) the retainer is designed to permit free lubrication flow; and (iii) the bearing assembly system itself is designed to prevent lubrication flow from the bearing assembly.

SUMMARY OF THE INVENTION

Among the several objects of the present invention may be noted the provision of an improvement to retain a bearing in position adjacent an end wall or endshield of a motor;

the provision of such improvement which includes a self-locking retainer readily installable in the motor during its assembly;

the provision of such retainer which self-aligns with the bearing during installation; and, the provision of such retainer which readily allows insertion of lubricant and/or flow back and forth between both sides of the retainer so that long life bearing performance for the motor is assured.

In accordance with this invention, generally stated, a dynamoelectric machine has a rotatable shaft journaled for rotation. In the embodiment illustrated, the dynamoelectric machine is a motor, and includes a housing or shell in which the shaft is installed. The motor includes at least one bearing assembly in which the shaft is journaled. The bearing assembly is installed adjacent an end wall or endshield for the motor. An improvement comprises a bearing retainer for holding a bearing of the bearing assembly in place. The retainer fits over the bearing and contacts an inner portion of the endshield of the motor to hold the bearing in position. The retainer is self-aligning with the bearing and self-locking to the endshield. The retainer is designed to permit injection and/or communication of the lubricant and lubricant material about the bearing assembly.

Other objects and features will be in part apparent and in part pointed out hereinafter.

BRIEF DESCRIPTION OF THE DRAWINGS

In the drawings.

Corresponding reference characters indicate corresponding parts throughout the several views of the drawings.

DESCRIPTION OF THE PREFERRED EMBODIMENT

Figure 1:
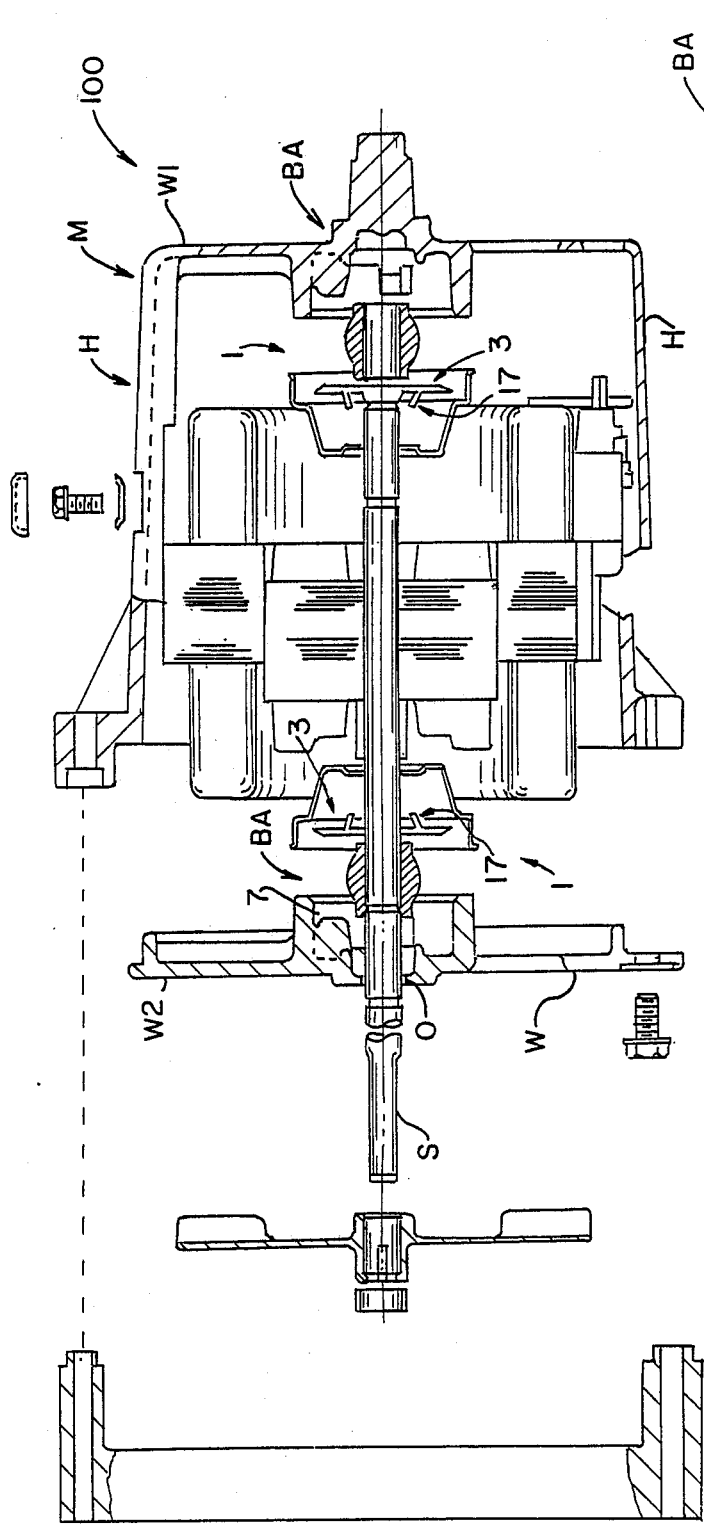
FIG. 1 is an expanded view showing one illustrative embodiment of a dynamoelectric machine employing the present invention.
Figure 2:
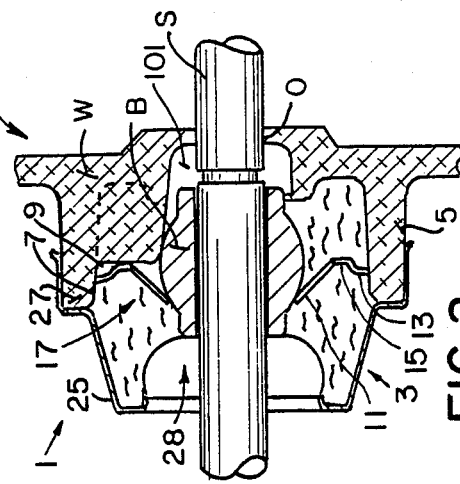
FIG. 2 is an enlarged, partial sectional view of a bearing assembly for the motor illustrated in FIG. 1, showing a motor shaft, a shaft bearing, a retainer and lubricant of the present invention.

Referring now to FIGS. 1 and 2, reference numeral 100 indicates one illustrative embodiment of a dynamoelectric machine, in the form of an induction motor M. The motor M comprises a housing H, a portion of which is shown in FIG. 1. A rotatable shaft S is installed in the housing so that at least one end of the shaft projects through an opening 0 in an end wall or endshield W. Shaft S is journaled at each end by a bearing assembly BA, one of which is shown in FIG. 2. The bearing assembly BA is installed in the endshield so that a bearing B of the assembly BA is positioned adjacent the inner face of each endshield W. Various other structural features shown in FIG. 1, which do not form a part of the present invention, are described in copending U.S. Patent Application Ser. Nos. 07/255,756, by Baker, No. 07/255,757, by Borcherding et al, No. 07/255,758, by Borcherding et al, No. 07/255,707, by Ottersbach, No. 07/255,727, by Hildebrandt et al, No. 07/255,706, by Borcherding et al, and No. 07/255,838, by Borcherding, are assigned to the assignee of the present application, and are intended to be incorporated herein by reference.

In the particular embodiment illustrated, components of the motor M are placed in the shell or housing H. The shell H has an integrally formed endshield W1. The shell is closed by the endshield W2. The invention disclosed hereinafter, while described with particular reference to the embodiment illustrated, finds application with any number of other motor constructions.

An improvement of the present invention comprises a bearing retention means 1 for holding the bearing B in place. Means 1 includes a retainer 3 installable over bearing B. The retainer fits over the bearing and contacts endshield W2, for example, to hold the bearing in position. The retainer is used with each endshield, and only one bearing assembly is described in detail. As shown in FIG. 2, end shield W2 has an inwardly extending projection 5 having a central axis which corresponds to the centerline of both opening O and to the longitudinal axis of shaft S. Retainer 3 has an outer diameter corresponding to the inner diameter of projection 5 so as to form an interference fit with an inner wall 7 of the projection 5 when the retainer is installed over bearing B. End shell W2 further has a radially inwardly extending shoulder 9 which extends partially around inner wall 7. That is to say, the shoulder 9 may be disconnected or interrupted, so that in use the shoulder is in fact a plurality of projections. In any event, the shoulder 9 of the wall 7 forms a stop both for the retainer 3 and the bearing B.

Retainer 3 is formed in three sections: an inner portion 11 contacting bearing B; an outer section 13 which contacts and bears against wall 7; and, an intermediate section 15, an arcuate segment of which bears or stops against shoulder 9. The outer section 13 of the retainer is generally disk shaped, with the outer rim flaring or tapering outwardly to surface 7. The inner section 11 is defined by a plurality of fingers 90, the shape and function of which are more fully described hereinafter. The intermediate section forms a transition between the inner and outer section, which acts as a stop during placement of the retainer.

Bearing B has longitudinal passage through it which has a uniform diameter along the passage length. The diameter of the passage corresponds generally to the diameter of shaft S for permitting the shaft to be journaled in the bearing B. The outer diameter BOD of the bearing B increases gradually from each end of the bearing to the mid-point thereof.

Retainer 3 has means 17 for self-aligning the retainer with the bearing and the bearing with the end shield W. The self-aligning means includes at least two and preferably four opposed fingers 21A, 21B, 21C and 21D respectively. Each of these fingers tapers inwardly from the perimeter of opening 19 and the degree of taper of the fingers is such that radially inward end 23 of each finger contacts the outer surface of the bearing at a point intermediate the midpoint of the bearing and an end thereof. In the embodiment illustrated, the fingers are equidistantly spaced about the perimeter of central opening 19 and there is a relatively large space between adjacent fingers.

It is vital for the proper operation of motor M that the bearings B be lubricated. For this purpose, a fiber based material saturated with suitable lubricant is injectable into the bearing assembly BA, and retainer 3 permits flow of the material and lubricant between both sides of the retainer. As shown in FIG. 2, a bearing cap 25 is formed to fit over an outer shoulder 27 of projection 5. Each endshield also has a chamber 101 formed outbound of the bearing B and inward of the opening 0 in the endshield. The chamber 101, while not a specific part of the present invention, is important in the overall operation of the bearing assembly BA as described in the above referenced Borcherding et al application, Ser. No. 255,758, incorporated herein by reference. The bearing cap, bearing, projection 5, and chamber 101 form a circumferential lubricant reservoir 28. When retainer 3 is installed, it effectively divides the reservoir into an inner and outer portion and the retainer can act as a barrier preventing lubricant flow between these portions.

Figure 3:
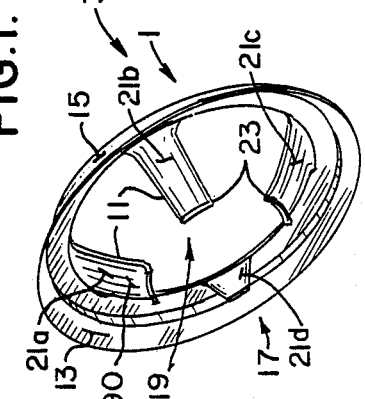
FIG. 3 is an elevational view of the retainer and bearing.
Figure 4:
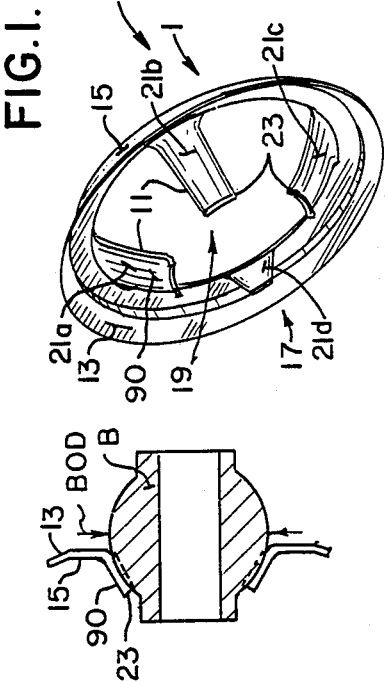
FIG. 4 is a sectional view taken along line 4—4 of FIG. 3.
Figure 5:
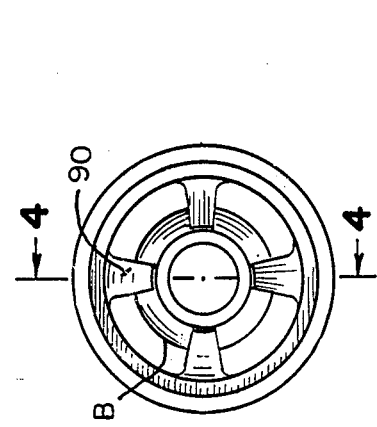
FIG. 5 is a perspective view of the retainer.

To facilitate injection of lubricant material during motor construction and lubricant flow in applicational use, the retainer fingers delimit wide passageways which allow the lubricant material to reach all parts of the motor adjacent endshield W1. That is to say, the area of the fingers is substantially less than the open area between the fingers, as may best be seen in FIG. 3. The openings between individual fingers 21 A–D constitute the primary flow passageway for lubricant material and lubricant between adjacent sides of the retainer.

Intermediate section 15 of retainer 3 is of a generally flattened annular shape after installation. The retainer 3 preferably is constructed from a suitable spring steel material. Consequently, after placement, retainer 3 will exert a spring force on the outer portion 13, forcing the portion 13 against the wall 7 to retain the position of the bearing in a tight, interference fit.

It will be understood that during injection of the lubricant, the lubricant is directed toward the bearing surface and maintains good bearing to lubricant contact while filling the reservoir. Complete reservoir fill is not required to obtain adequate bearing/lubricant contact. The free flow of material and lubricant provided by the retainer of this invention means adequate bearing life can be obtained even when complete reservoir fill is not accomplished in motor production.

Numerous variations, within the scope of the appended claims, will be apparent to those skilled in the art in light of the foregoing description and accompanying drawings. Thus, if necessary, the fingers 21A–D circumferential dimension maybe increased. If additional lubricant flow is required, it can be obtained by placing additional, secondary openings in the fingers, near the center point 15 of the retainer. The housing H preferably is constructed from plastic. Other materials may be employed, if desired. The housing may be eliminated in other embodiments of this invention. That is to say, the retainer and bearing assembly of the present invention can be applied to a number of motor constructions, including those where endshields of skeleton like construction are mounted directly to the core of the stator assembly, for example. These variations are merely illustrative.

Having thus described the invention, what is claimed and desired to be secured by Letters Patent is:

1. In a dynamoelectric machine including a housing, a rotatable shaft installed in the housing, at least one bearing in which the shaft is journaled, the bearing being installed in the housing adjacent an end wall thereof, and a cap enclosing the side of the bearing opposite the end wall to form a chamber filled with a bearing lubricant the improvement comprising bearing retention means including a retainer fitting over the bearing and contacting the end wall of the housing to hold the bearing in position, the retainer including means for self-aligning the bearing with respect to the shaft, the self aligning means including a plurality of fingers for holding the bearing, the fingers having passages therebetween for the free flow of lubricant, with the overall area of the passages delimited by the fingers being substantially larger than the overall area of the fingers.

2. The improvement of claim 1 wherein the end wall has an inwardly extending projection whose centerline intersects with the longitudinal axis of the shaft, the retainer having a silhouette at least corresponding to the inner shape of the projection whereby the retainer, when installed over the bearing, creates an interference fit with an inner wall of the projection, locking it in position.

3. The improvement of claim 2 wherein the housing end wall further includes a radially inwardly extending shoulder extending around the inner wall of the projection and forming a stop, and the retainer has an intermediate section which stops against the shoulder.

4. The improvement of claim 3 wherein the shoulder has an interrupted face.

5. The improvement of claim 4 wherein the bearing has an inner diameter uniform along the length of the bearing and an outer diameter which gradually increases toward the mid-point thereof, and the retainer fingers taper inwardly to define an opening for receiving the bearing, the degree of taper of the fingers being such that the outer end of the fingers contact the outer surface of the bearing intermediate the mid-point and the inner end thereof.

6. The improvement of claim 5 wherein the self-aligning means comprises at least two fingers tapering inwardly, between adjacent fingers delimiting a flow passage for lubricant and lubricant material.

7. The improvement of claim 6 wherein the fingers form an inner section of the retainer.

8. The improvement of claim 6 wherein the machine is lubricated by lubricant material flow injected on one side of the retainer, the spacing between the fingers comprising a primary passageway for lubricant flow from one side of the retainer to the other side of the retainer.

9. The improvement of claim 8 wherein the retainer has an intermediate portion of a generally flattened, annular shape.

10. The improvement of claim 9 wherein the retainer includes a rim forming the perimeter of an outer section of the retainer, the rim flaring outwardly of the intermediate portion of the retainer.

11. The improvement of claim 1 wherein all the fingers are substantially identical in size and shape.

12. A retainer for use in a dynamoelectric machine having a housing, a rotatable shaft installed in the housing and at least one bearing in which the shaft is journaled, the bearing being installed in the housing adjacent an end wall thereof, the retainer fitting over the bearing and contacting an inwardly extending projection of the end wall of the housing to hold the bearing in position, the retainer having a silhouette at least corresponding to the inner shape of the projection whereby the retainer, when installed over the bearing, creates an interference fit with an inner wall of the projection, locking it in position; and, the retainer including means for self-aligning the bearing with respect to the shaft, the self aligning means including four fingers of substantially identical size and shape for holding the bearing, the fingers having passages therebetween for the free flow of lubricant, the area of the passages being substantially larger that the area of the fingers, the fingers tapering inwardly and forming an inner section of the retainer, with the space between adjacent fingers delimiting a flow passage for lubricant and lubricant material, the housing end wall further including a radially inwardly extending shoulder extending around the inner wall of the projection and forming a stop, and the retainer further having an intermediate section of a generally annular, flattened shape which stops against the shoulder, the retainer further having a rim forming the perimeter of an outer section of the retainer, the rim flaring outwardly of the intermediate portion of the retainer.

13. The improvement of claim 12 wherein the bearing has an inner diameter uniform along the length of the bearing and an outer diameter which gradually increases toward the mid-point thereof, and the retainer fingers taper inwardly to define an opening for receiving the bearing, the degree of taper of the fingers being such that the outer end of the fingers contact the outer surface of the bearing intermediate the mid-point and the inner end thereof.

14. The improvement of claim 13, wherein the machine is lubricated by lubricant material flow injected on one side of the retainer, the spacing between the fingers comprising a primary passageway for lubricant flow from one side of the retainer to the other side of the retainer.

* * * * *